United States Patent
Webb, Sr.

(10) Patent No.: US 7,209,037 B2
(45) Date of Patent: Apr. 24, 2007

(54) SYSTEM AND METHOD FOR MONITORING A SECURITY OF AN ASSET

(75) Inventor: Gregory E. Webb, Sr., Arlington Heights, IL (US)

(73) Assignee: InfrAegis, Inc., Arlington Heights, IL (US)

( * ) Notice: Subject to any disclaimer, the term of this patent is extended or adjusted under 35 U.S.C. 154(b) by 0 days.

(21) Appl. No.: 11/384,766

(22) Filed: Mar. 20, 2006

(65) Prior Publication Data

US 2007/0008114 A1 Jan. 11, 2007

Related U.S. Application Data

(63) Continuation of application No. 10/648,933, filed on Aug. 27, 2003, now Pat. No. 7,046,138, which is a continuation-in-part of application No. 10/464,523, filed on Jun. 17, 2003, now Pat. No. 7,012,520.

(51) Int. Cl.
*G08B 1/08* (2006.01)

(52) U.S. Cl. .............. 340/539.13; 340/541; 340/572.4; 713/164; 713/200; 348/143; 348/152

(58) Field of Classification Search ........... 340/539.13, 340/539.1, 517, 541, 426.28, 568.2, 426.1, 340/825.36, 539.14, 539.4, 522; 348/143, 348/152; 713/164, 200
See application file for complete search history.

(56) References Cited

U.S. PATENT DOCUMENTS

| | | | |
|---|---|---|---|
| 4,688,244 A | 8/1987 | Hannon et al. | |
| 5,615,247 A | 3/1997 | Mills | |
| 5,724,425 A | 3/1998 | Chang et al. | |
| 6,288,642 B1 | 9/2001 | Dohrman | |
| 6,529,141 B1 | 3/2003 | Hanebeck et al. | |
| 6,610,977 B2 | 8/2003 | Megerle | |
| 6,658,091 B1 | 12/2003 | Naidoo et al. | |
| 6,717,517 B2 * | 4/2004 | Przygoda, Jr. ........... 340/572.4 |
| 6,720,905 B2 * | 4/2004 | Levitan et al. ................. 342/22 |
| 6,748,325 B1 | 6/2004 | Fujisaki | |
| 6,816,090 B2 | 11/2004 | Teckchandani et al. | |
| 6,930,596 B2 * | 8/2005 | Kulesz et al. ............... 340/506 |
| 2004/0041706 A1 | 3/2004 | Stratmoen et al. | |

* cited by examiner

*Primary Examiner*—Daniel Wu
*Assistant Examiner*—Daniel Previl
(74) *Attorney, Agent, or Firm*—Mayer, Brown, Rowe & Maw LLP

(57) ABSTRACT

A security system and method for monitoring a security status of fixed and mobile assets. The security system comprises an agent connected with the asset. The agent monitors a security of the asset and transmits the data to a master control unit. The master control unit retransmits the security status to a global operations center for processing the security status to detect a security threat. In response to a security threat, the global operations center generates an output. Periodic reports are generated and transmitted to the customer, and the customer is billed at intervals. For mobile assets, the security system also tracks a location of the asset as the asset is transported between a shipper's loading dock and a designated distribution center, including an origination port and a destination port. For fixed agents, the security system includes an interface for interfacing an existing security device to the master control unit and for controlling the existing security system.

40 Claims, 9 Drawing Sheets

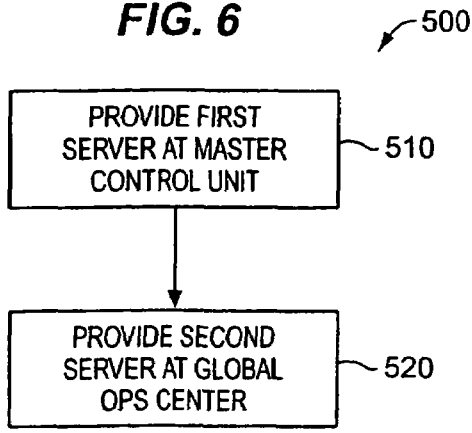
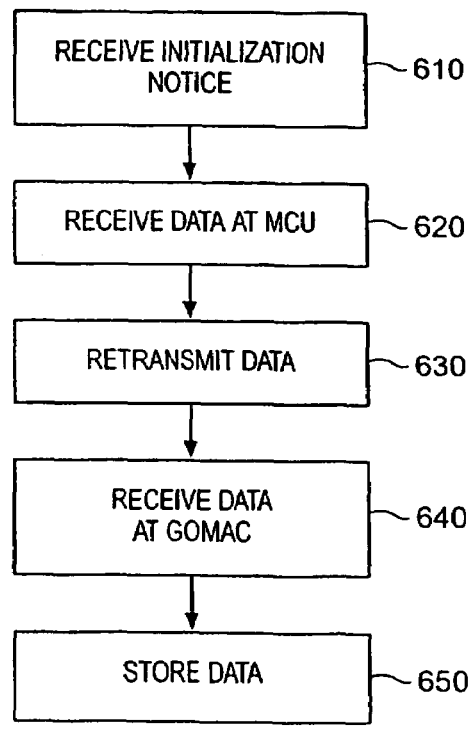
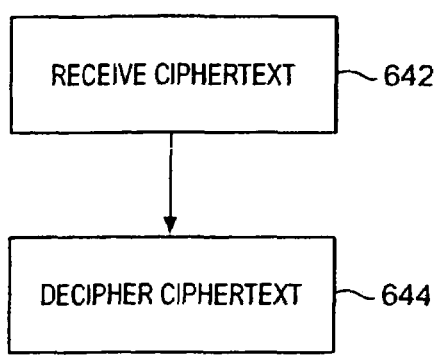

SYSTEM AND METHOD FOR MONITORING A SECURITY OF AN ASSET

RELATED APPLICATIONS

This application is a continuation of and claims priority to U.S. application Ser. No. 10/648,933 filed Aug. 27, 2003, now U.S. Pat. No. 7,046,138 which is a continuation-in-part of U.S. patent application Ser. No. 10/464,523 filed Jun. 17, 2003 now U.S. Pat. No. 7,012,520. The related patent applications are hereby incorporated by reference as though fully disclosed herein.

BACKGROUND OF THE INVENTION

1. Field of the Invention

The invention relates to a security system, and more particularly to a global system and method for monitoring a security of an asset to detect a security threat.

2. Statement of the Problem

Since the September 11 catastrophe, security has become a major concern, wherein requests to more actively track the whereabouts of trucks and other assets have been overwhelming. One area of concern is the physical security of public locations, including enterprises, campuses, and other public buildings. The security measures taken by private and public organizations since the tragic attacks have been implemented as overall preventive measures; measures that should have been implemented years ago for the safety of the public and the consumer.

Conventional physical security measures such as intrusion detection, CCTV surveillance, metal detection, perimeter security using bollards, and protection of building air intakes are often the first line of defense against terrorism for high-threat, high vulnerability infrastructures. These methods are often supplemented with operational procedures to mitigate an attack, including pre-planned evacuation strategies. Such measures, however, are not sufficient to counter unconventional threats such as dirty bombs, and chemical and biological weapons of mass destruction; nor do the conventional security measures focus on increasing security for freight elevators, loading docks or parking lots, places that are vulnerable to placement of explosives.

Another area of concern is cargo being tampered with or dangerous packages being implanted onto transporting vehicles. US Customs has implemented new rules on the advance submission of cargo manifests in the trades to the US. The new rule is stated by the US Customs: "For any vessel . . . except for any vessel exclusively carrying bulk or break bulk cargo, Customs must receive from the carrier vessel the vessel's Cargo Declaration, or an electronic equivalent, 24 hours before such cargo is laden aboard the vessel at the foreign port."

The four core elements of the US Customs Container Security Initiative ("CSI") focus specifically on container traffic and aims to screen inbound containers before they reach the United States. The four core elements of CSI are: (1) establishing security criteria to identify high-risk containers; (2) catching high-risk containers before they arrive at US ports; (3) using technology to quickly prescreen or inspect high-risk containers; and (4) developing and using smart and secure containers.

Failure to provide complete and timely documentation results in cargo that carriers will not load or that US Customs will not permit to unload. Importers need to make sure that their suppliers and logistics providers comply with the regulations, or risk having cargo stranded at the point of origin, or, even worse, on an inbound vessel that cannot be unloaded.

Many shipping companies attach transmitting devices to shipping containers to track their geographic location. This allows the shipping company to determine the geographic location of the container as it moves between the origination and destination points to determine whether the goods inside the container are on time, late, or somehow misplaced. For instance, the container may have been misrouted or been placed on the incorrect transportation vehicle to reach its destination. Tracking of containers in transit is well developed, including the use of satellites and other electronic technology to obtain real-time data on in-transit locations.

The tracking devices associated with the container rely on the transmission and reception of various types of communication signals, such as electromagnetic and/or radio frequency signals, for determining the geographic position. A problem occurs when the container with the tracking device is loaded onto a transportation vessel, such as a ship, wherein containers are loaded into areas of the vessel which obstruct the signals. The user is left to track the vehicle rather than the container and trust that the container did indeed get loaded onto the vessel. While out-of-range, the tracking system is essentially deactivated since it is unable to communicate with the control station.

Other known security systems include alarm systems that secure the contents of trailers/fleets from origination to destination. Local alarm systems serve as a theft deterrent by sending tamper-detection alerts. An attempt to tamper with the doors of the trailer results in the system sending an alarm to a pager carried by the drivers (allows detection only with a specific range). The system also tracks events history, such as door openings. Widespread usage of alarm systems is seen among small- and medium-sized fleets.

A radio frequency device that transmits shipping data as it passes a reader device and indicates whether the container to which it is attached has been tampered with is the "e-seal". The e-seal consists of a bolt that locks the container when inserted into the seal body and serves as an antenna. The seal body contains a microchip for encoding the information and transmitting that information when queried by a reader. However, the container to which it is attached is required to be within range of the reader for transmission. Therefore, the data is not updated while the container is in transit between an origination and a destination. Another problem with the e-seal is that e-seals have limited signal strength and must be read at line-of-sight distances that do not exceed 70 feet. This makes it difficult to read these particular seals in marine terminals or the holds of ships where containers are stacked in close proximity or where the signals may be blocked.

Another problem is detecting packages loaded into containers and carried into buildings or other public places that poses a radiation threat. The three primary methods of detecting radiation threats in cargo containers are: (a) manual inspection, (b) remote inspection, and (c) in-container detection. The shortcomings of manual inspection are obvious. Remote inspection involves scanning a container with penetrating radiation as is done for luggage screening at airports. An important difference, however, is that airport scanners use low intensity x-rays, whereas cargo containers use high-intensity, high-energy gamma rays owing to the size and metal construction of the containers. Use of high-intensity, high-energy gamma rays is potentially harmful to humans, relies on a human observer to identify a radiation threat, requires a change in the unloading procedures, which may result in delays, and does not provide offshore protection.

Globalization and free flow of trade across porous borders is a phenomenon that terrorists and trade partners both exploit. As US companies flourish in globalization and become more visible, their overseas facilities and personnel might offer terrorists more and softer targets for anti-American sentiment. However, organizations should guard against burdensome physical security that may jeopardize free trade across friendly borders; nor should the security measures undertaken stymie the economic benefits of global information networks and international business.

For these reasons, there is a need for a reliable security system that provides the customer with a comprehensive security protection for fixed and mobile assets.

SUMMARY OF THE INVENTION

The present invention advances the art and helps overcome the aforementioned problems by providing a security system and method that monitors and analyzes a security status of fixed and mobile assets and responds to detected potential threats. The security system includes at least one server at a global operations monitoring analysis center ("GOMAC") and at least one agent connected with a corresponding fixed and mobile asset for monitoring a security of the asset to generate a security status for that asset. A server communicates with the agent for receiving the security status, which is stored in a database in the server. The server executes a threat detection software for analyzing the security status to detect the security threat. When a security threat is detected, a security process is followed for determining a response to the detected threat based on the type of security threat detected. An output is generated for performing the response in accordance with the process. The system and method includes a method for billing the customer for the security service provided.

The system includes providing a first server connected with a master control unit for receiving the security status from the agent and a second server at a global operations center. The first server retransmits the security status to the global operations center. The security status received from the agent includes environmental data and physical data, and for mobile assets also includes position data. The environmental data received may be chemical, biological, explosive, or nuclear data for detecting a potential environmental threat. In response to detecting the potential threat, the computer system may initiate a counter measure, notify at least one of an appropriate official or agency, or control the operation of a system within a fixed asset.

Periodically, a report is generated and, at intervals, the customer is billed for the security service. The bill includes a lease fee, if the agents were leased to the customer, a report fee if the number of reports generated exceeds a predetermined limit, and a monitoring fee for the time period during which the GOMAC monitored the security of the asset.

When the asset being monitored is a mobile asset being transported between an origination and a destination, the cargo loaded into the mobile asset is inventoried and a manifest generated for the asset. The manifest is transmitted to at least one of the master control unit, the GOMAC, and a customs agent. The agent also transmits a position data to the master control unit or the GOMAC wherein the position data is used to determine if the asset deviated from a predetermined route and schedule.

The above and other advantages of the present invention may be better understood from a reading of the following description of the preferred embodiments of the invention taken in conjunction with the drawings in which:

BRIEF DESCRIPTION OF THE DRAWINGS

FIG. 6 is a flow diagram of a method of providing a server in communication with an agent according to the present invention;

FIG. 7 is a flow diagram of a method of receiving data from an agent according to the present invention;

FIG. 8 is another flow diagram of a method of receiving data from an agent according to the present invention;

DETAILED DESCRIPTION OF THE PREFERRED EMBODIMENT

In this disclosure, the term "agent" refers to a self-powered electrical or electromechanical sensing and communicating device for monitoring a physical location and a security status of a cargo container, also referred to as a communicating intelagent® agent (CIA), a pallet trakker® agent, or a fixed intelagent® agent (FIA) depending on the usage of the agent. When used as an agent for monitoring a security status of a fixed asset, the agent is referred to as an FIA. Agents attached to commercial and military mobile containers are referred to as CIAs and pallet trakker® agents, respectively. Each of the FIA, CIA, and pallet trakker® agents have security-monitoring features and may include alternative configurations.

The term "asset" refers to the mobile asset or fixed asset that is being monitored. The mobile asset may be a container, pallet, or an individual or any other asset that is mobile and traveling between an origination and a destination or an unknown route. A fixed asset may include buildings, enterprises, campuses, city surveillance, transportation hubs, power stations or substations, nuclear power plants, or other structure or physical location.

Figure 1:
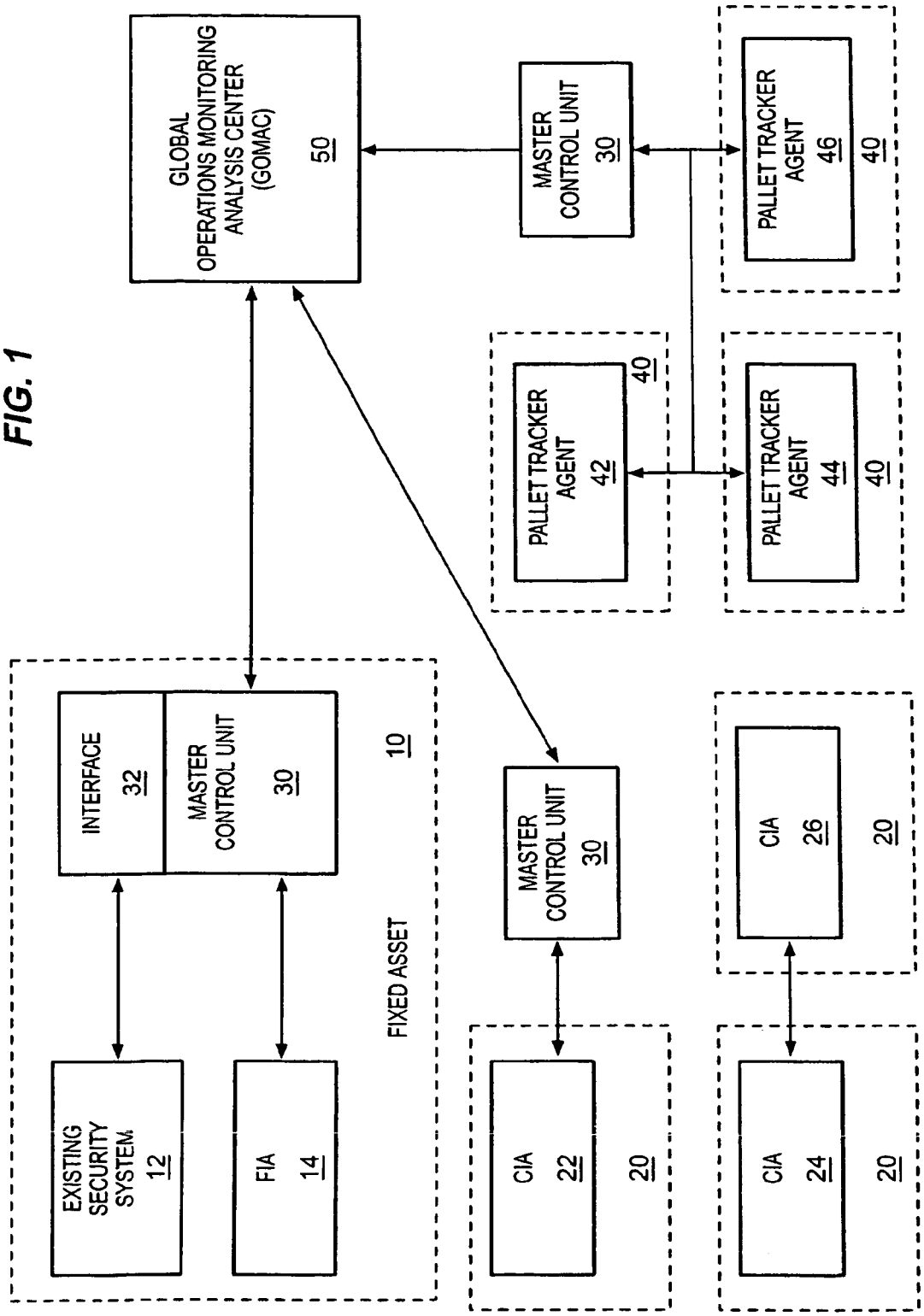
FIG. 1 is a block diagram of a global remote detection security system according to the present invention.

The security system and method of the present invention provides both wired and wireless devices and services for the protection of fixed and mobile assets against theft, tampering, or terrorist attacks using nuclear, chemical, or biological materials. The security system and method addresses three market segments: commercial mobile assets, military mobile assets, and fixed assets. FIG. 1 is a block diagram of the global intelligent remote detection system of the present invention. The system includes a global operations monitoring analysis center (GOMAC) 50, master control units (MCUs) 30 in communication with the GOMAC 50, and a plurality of agents 12–14, 22–26, and 42–46. The plurality of agents 12–14, 22–26 and 42–26 include sensors such as chemical, biological, and nuclear detectors, door position sensors, light sensors, or other sensors for sensing a physical and environmental security. The system provides cross application management and execution of policy, threat detection, alarms, automatic notifications, and automatic counter measures on an event-driven basis. Communication between the agents, agents and the MCU, and between the MCU and the GOMAC is encrypted and may also be compressed. A more detailed description of the global intelligent remote detection system is found in related patent application Ser. No. 10/464,523 which is hereby incorporated by reference.

The mobile assets may be cargo containers 20, pallets 40, or an individual traveling domestically or internationally. When the cargo is commercial, a communicating intelligent agent (CIA) 22–26 is connected with the container for monitoring the security and position of the container. The CIA agent and pallet trakker® agent includes a position sensing device such as a position guidance system or a receiver for receiving a position data. The security status and position of mobile military assets is monitored by attaching a pallet trakker® agent 42–46 to each one of the pallets. The CIAs and/or pallet trakker® agents are in communication with other CIAs and/or pallet trakker® agents within range via a virtual Intranet and with the MCU 30 for sending the security status and position data to the GOMAC 50. During transit, the CIAs 22–28 and pallet trakker® agents 42–46 monitor the physical security of the container to detect occurrences, such as tampering with the container, and to detect a chemical, biological, explosive, and nuclear material within range. When a nuclear material is detected, the radiation threat may be confirmed by a subject matter expert at the GOMAC.

The assets may be mobile assets being transported over a predetermined route between a shipper's loading dock and a designated distribution center, the predetermined route include an origination port and a destination port. The agent may include a receiving device for receiving a location data, wherein the location data is transmitted to the master control unit with the security status. The security system may also include a loading master control unit for inventorying the cargo loaded into the asset at the shipper's loading dock and creating a manifest which is uploaded from the loading master control unit to at least one of the agent and the global operations center. The loading master control includes a scanner for automatically inventorying the cargo as the cargo is loaded into the asset and a receiver for receiving a location data.

The security system includes an origination port master control unit for receiving the manifest and the security status from the agent prior to arrival of the container at the origination port and a destination port master control unit at the destination port, wherein an onboard master control unit notifies the destination master control unit which container it is carrying and uploads the manifest and the security status to the destination port master control unit as the container is approaching the destination port.

The fixed asset 10 may be a building, enterprise, campus environment, or a key public access point. The fixed asset 10 may include an existing security system 12 and one or more FIAs 14. The output of the existing security system 12 may be interfaced 32 with the MCU 30, with additional security provided by installing FIAs 14 within the fixed asset 10. The communication channel between the existing security system 12 and FIAs 12, 14 and the MCU 30 may be wired, or the communication between an FIA and the MCU 30 may be wireless. The FIAs may also create an intranet for communication between the FIAs so that an FIA that is not within range of the MCU 30 may wirelessly transmit the security status to an FIA within range.

The facility may have existing security processes and procedures for responding to detected threats. The security system and method of the present invention may be programmed to automatically initiate actions and classified and non-classified counter measures following existing or modified processes. The responses may be as simple as sending an alarm to a guard or control center to initiate verification and further action. The detected threat may also trigger more direct actions from the GOMAC, such as bolting of certain doors in the building, controlling an operation of a ventilation system, a lighting system, or other systems within the fixed asset. Under predetermined circumstances, many actions may be automatically initiated simultaneously, eliminating the delays and errors that can occur when human intervention is a mitigating factor. The response may also be to send an alarm or a notification to an appropriate official or agency in accordance with the security process.

The security system and method of the present invention includes advanced security measures such as radiation perimeter control in which radiation detectors are deployed several feet from the building perimeter to detect and simultaneously focus a high-speed digital signal processor camera system on potential terrorists. For a radiation detection breach, cameras focus on the individual. One option would be to have the security guard detain the person, or a more detailed evaluation with more accurate instrumentation may be requested. A more automated procedure may be adapted wherein centralized technical support is used. When a potential threat is detected by one or more sensors and verified by a scientist at the GOMAC, operational planning automatically determines whether that breach requires a low-level response, such as detaining an individual for questioning, or a high-level response. If a high-level response is required, then a series of countermeasures can be simultaneously executed, including all doors closed and locked immediately, appropriate state, federal and other officials notified immediately, as well as other physical responses to resolve the breach.

Global Operations Monitoring Analysis Center

Figure 2:
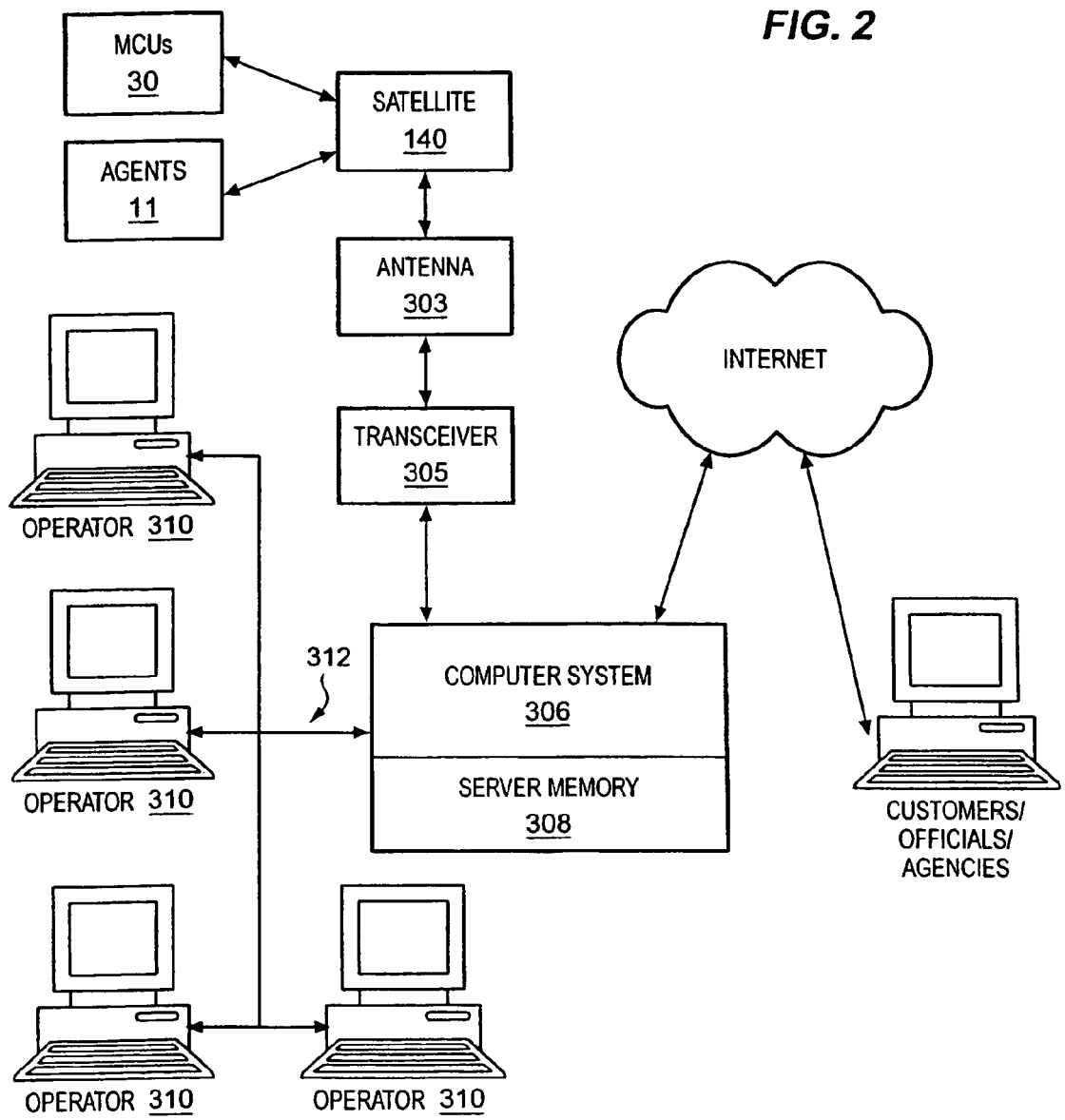
FIG. 2 is a block diagram of the global operations monitoring analysis center of the present invention.

The GOMAC illustrated in the block diagram of FIG. 2 preferably includes one or more antennas 303 for receiving and transmitting via a communication satellite 140; a transceiver 305; a computer system 306 for processing the received data; and a memory, preferably in a server 308, for storing the received security status data and GPS position for a plurality of agents 11. The computer system includes a decryption algorithm for decrypting the ciphertext and software for decompressing the received plaintext corresponding to the security status data. In a preferred embodiment, the GOMAC is located inside the secure facilities of, and in partnership with, the Argonne National Laboratory in Argonne, Ill., southwest of Chicago.

A team of security operators is interfaced with the computer system 306 via a network 312 to allow the operators to review the security status data, threat analysis, and any responses to detected threats. The GOMAC may also include subject matter experts to verify a detected threat and to respond to the detected threat. An Internet connection allows the operator, via the computer system, to communicate with customers, officials, and agencies as required. Similarly, the server may directly communicate with customers, officials, and agencies via the Internet.

Figure 3:
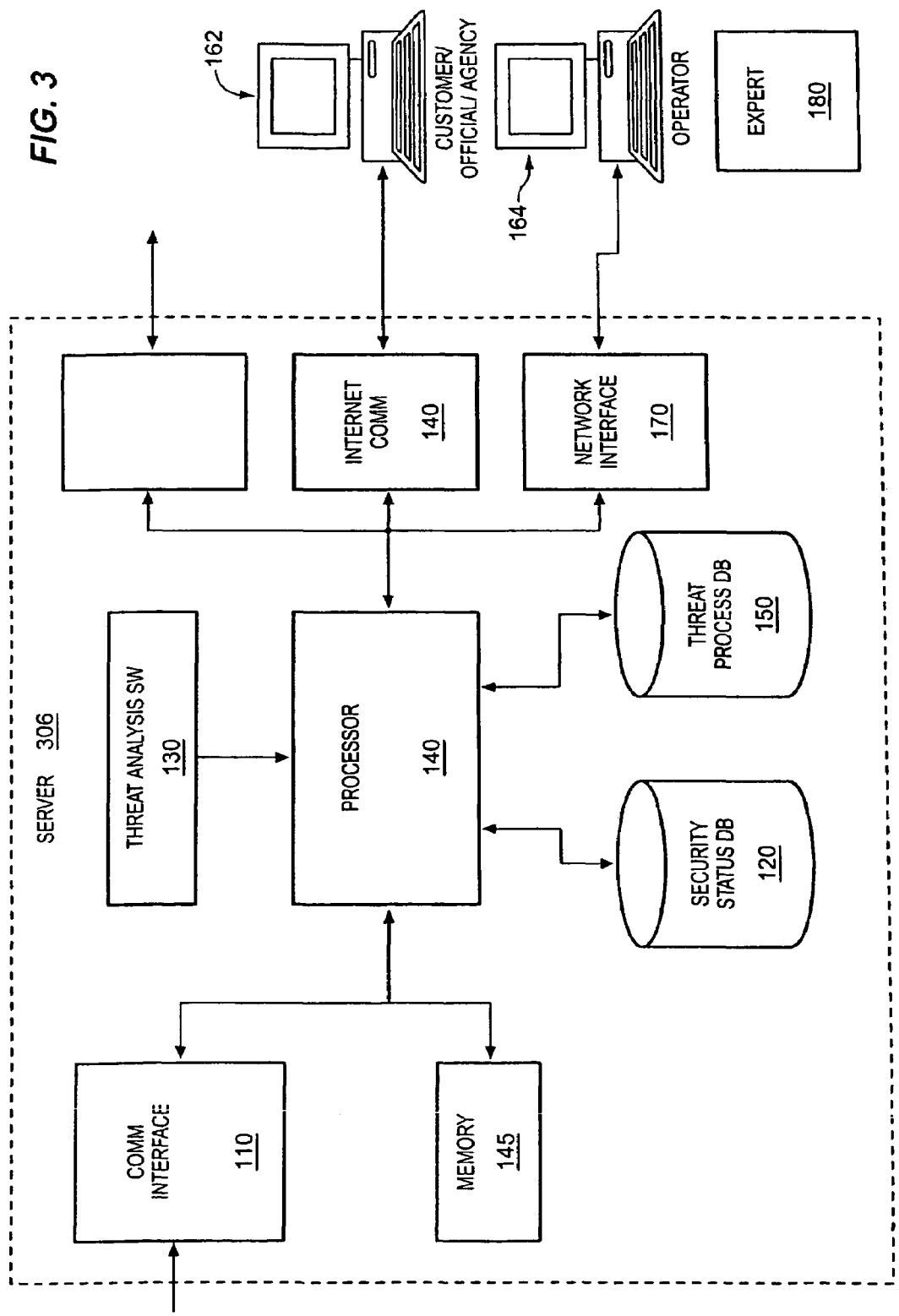
FIG. 3 is a block diagram of the server located at the global operations monitoring analysis center according to the present invention.

FIG. 3 is a block diagram of a server located at the GOMAC in a preferred embodiment. The server includes a communication interface 110 for sending and receiving data to and from the agents via the transceiver 305 (FIG. 2); a security status database 120 for storing security status data; a threat analysis software 130; a processor 140 for executing the threat analysis software 130 to detect a security threat; at least one threat process in a process database 150 for responding to detected threats; a network interface 170 for communicating with GOMAC operators; and an Internet interface 160 for communicating with customers, officials, and agencies.

Figure 4:
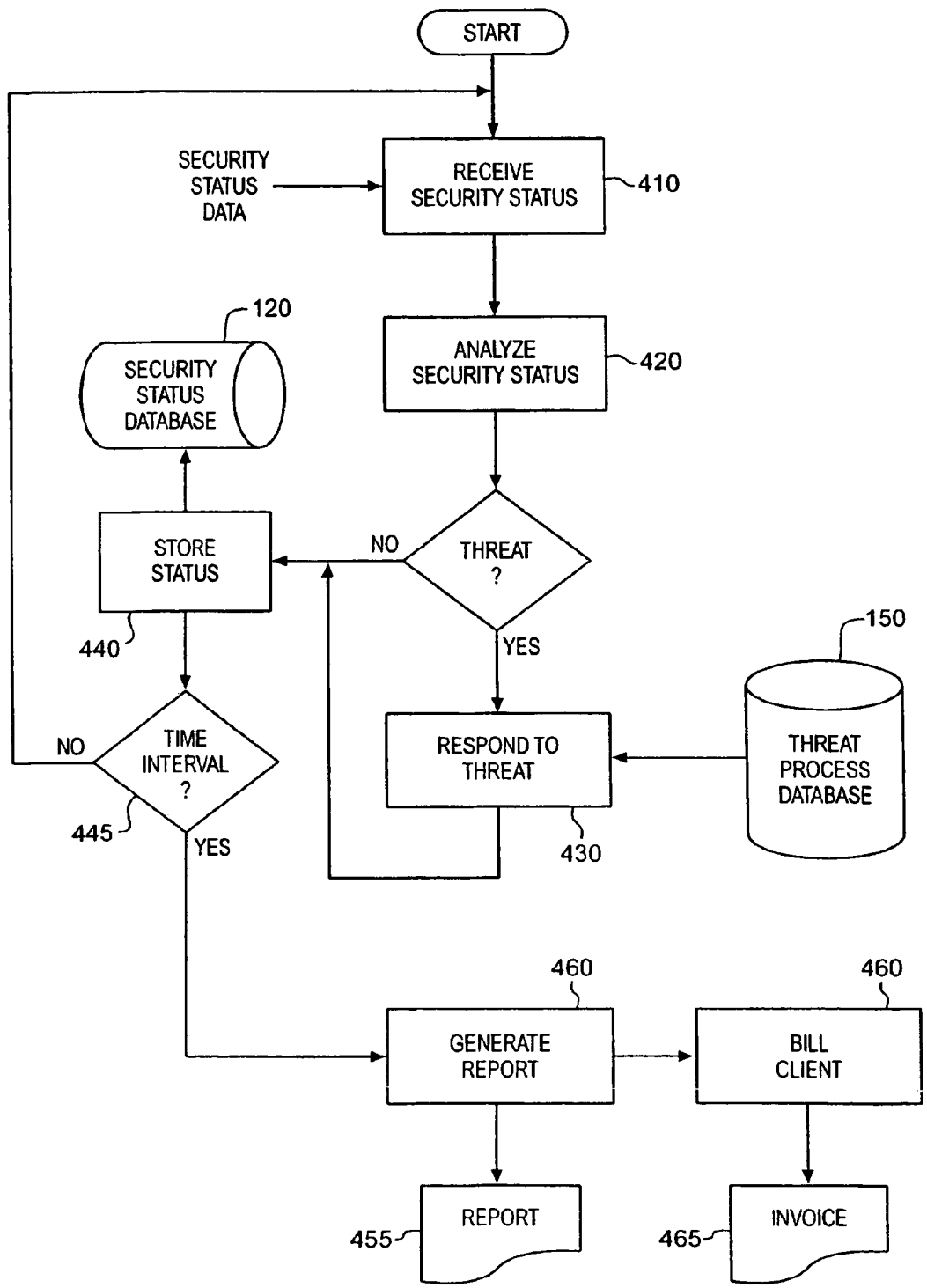
FIG. 4 is a system flowchart of operation of the global operations monitoring analysis center according to the present invention.

Referring to the system flow chart of FIG. 4 in conjunction with the block diagrams of FIGS. 1–3, in process 410 security status is received at the server located in the GOMAC 50 via communication interface 110. The security status data may be transmitted from a FIA 14, CIA 22–26, and a pallet trakker® agent 42–46 to the GOMAC 50, or the security status may be transmitted to a MCU 30 and retransmitted from the MCU 30 to the GOMAC 50. The security status data is analyzed in process 420 to detect a security threat. If a threat is detected in process 425, the threat is responded to in process 430 in accordance with a process stored in the threat process database 150. If a threat is not detected in process 425, the security status is stored in a security status database 120. Likewise, after the detected threat has been responded to in process 430, the analyzed security status is stored in process 440 in the security status database 120. At timed intervals determined in process 445, a report 455 is generated in process 450 and an invoice is generated in process 460 and transmitted to the customer. Alternatively, a report may be generated by request or generation of the report may be triggered by an event.

Security Business Models

Following a traditional direct-to-customer business model, the security service provider sells or leases the security system to the customer for monitoring a security status of fixed assets, mobile assets, or both. The agents and at least one MCU may be installed within a fixed asset for monitoring the security status of the fixed asset as previously described. For mobile assets, the security service provider may sell a plurality of agents to a customer wherein the customer installs the agents within mobile assets for tracking and monitoring the mobile asset during transport between an origination and a destination. The security service provider may also provide training services to train customer personnel to operate the system and to install and initialize the agents within the mobile assets. In return for the installation of the product, the security provider receives payment from the customer. Customers may include importers that import goods, which are transported from the manufacturer's loading dock to a destination, a building owner, a service provider, and a governmental agency. Once installed and initialized, the security service provider monitors the security status data received at the GOMAC.

Following the value net integrator business model, the security service provider collects information from the agents and the master control units and makes this information available to the customer, customs agent at the origination port and the destination port, or other designated entity. Following the installation of the security system, the security service provider provides real-time monitoring of the security status of the asset for a fee. When the asset is a mobile asset, the GOMAC tracks the mobile asset during transit between a shipper's loading dock, an origination port, a destination port, and a designated distribution center. The process is reversed for outbound export of mobile assets.

Figure 5:
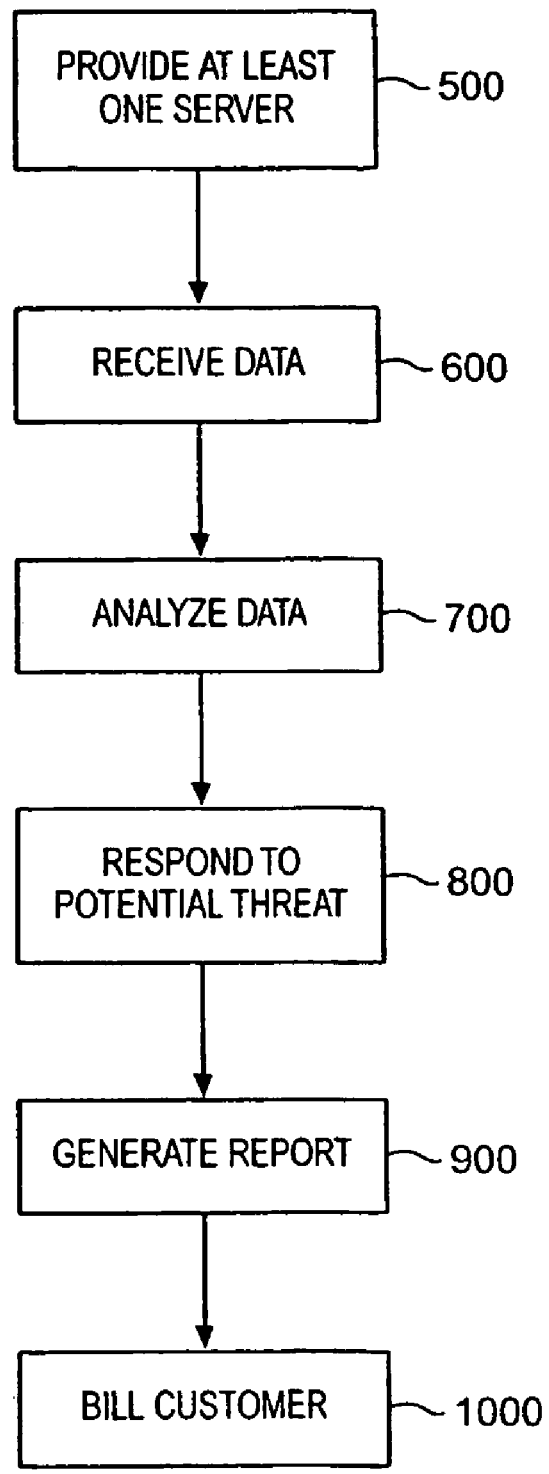
FIG. 5 is flow diagram of the operation of the security system according to the present invention.

FIG. 5 is a flow diagram of the operation of the security system of the present invention.

Referring to the flow diagram of FIG. 5 in conjunction with the block diagrams of FIGS. 1–3, an agent is connected with the asset being monitored. At least one server 308 (FIG. 2) is provided at the GOMAC in process 500 for monitoring the security status of the asset. The GOMAC receives security status data and position data in process 600, and in process 700 the received security status is analyzed to detect a security threat. If a security threat is detected in process 700, the security threat is responded to in process 800. Periodically, the security service provider generates security reports 455 (FIG. 4) for the customer in process 900, and in process 1000 the customer is billed for the security monitoring service.

The providing of at least one server process 500 is shown in more detail in FIG. 6. According to the flow diagram of FIG. 6, a first server connected with a MCU 30 is provided in process 510 and a second server 308 (FIG. 2) located that the GOMAC is provided in process 520. The MCU 30 is in communication with the agents and with the GOMAC. The receiving data process 600 is shown in more detail in FIGS. 7 and 8. According to the receiving data process of FIG. 7, in process 610 the MCU receives an initialization notification when an agent is installed and initialized. Thereafter, the MCU 30 (FIG. 1) receives security status data and position data from the agents in process 620. The security status and position data are transmitted from the MCU to the GOMAC for the designated area in process 630. Once the GOMAC receives the retransmitted initialization notification, security status and position data from the MCU 30 in process 640, the GOMAC begins monitoring the security status of the initialized agent. The received data is stored within memory at the GOMAC server 306 (FIG. 2) in process 650.

The receive data at the GOMAC process 600 is shown in more detail in FIG. 8. According to the receive data at the GOMAC process of FIG. 8, the GOMAC receives ciphertext from the MCU 30 in process 642 and deciphers the ciphertext in process 644 to generate a plaintext of the received data. Encryption of the security status and position data provides a level of security. The data received at the GOMAC in process 640 includes environmental data and physical data relating to the overall security of the asset being monitored. The plaintext data is analyzed in process 700 at the GOMAC to detect a security threat.

Figure 9:
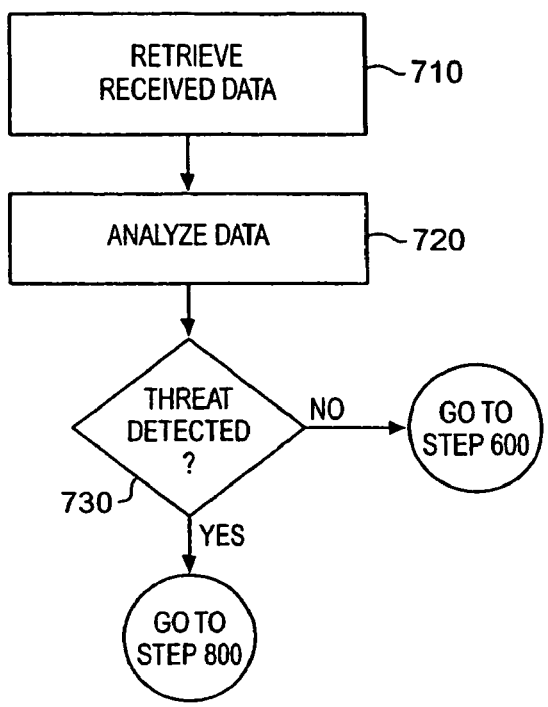
FIG. 9 is a flow diagram of a method of analyzing the received data to detect a security threat according to the present invention.
Figure 10:
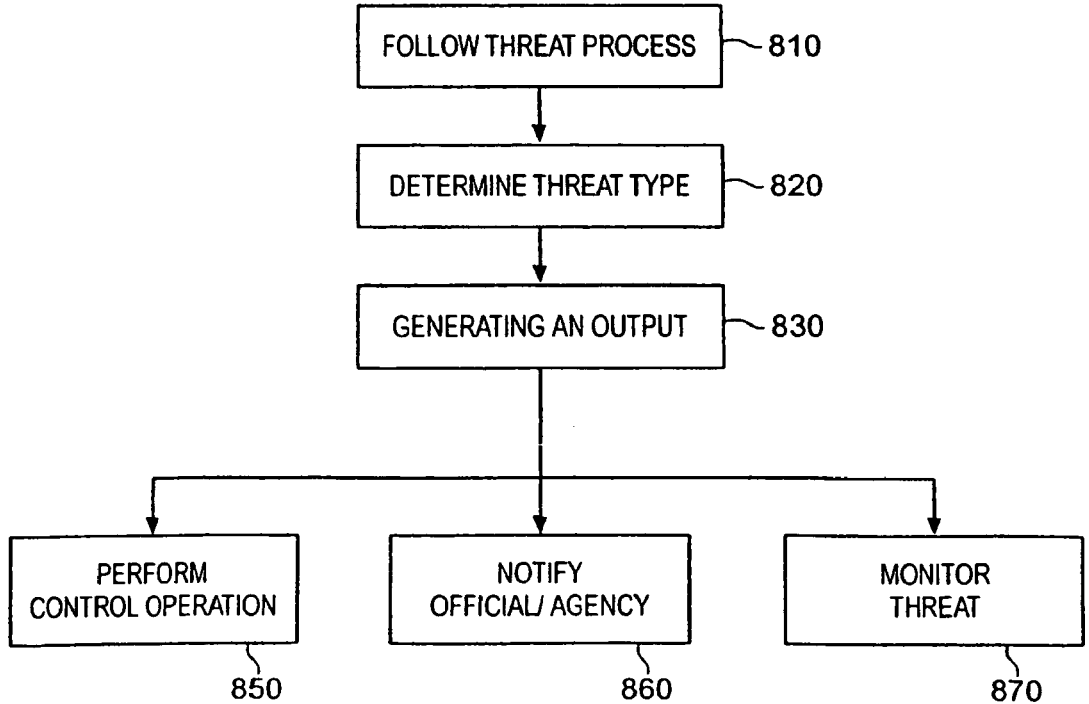
FIG. 10 is a flow diagram of a method of responding to a detected security threat according to the present invention.

The analyze data process 700 is shown in more detail in FIG. 9. The security status data and position data stored in process 650 is retrieved in process 710. According to the flow diagram of FIG. 9, the GOMAC includes a threat analysis software 130 (FIG. 3) for analyzing the retrieved security status data and position data in process 720 to generate a pattern analysis. If a potential security threat is not detected in process 730, the GOMAC server continues receiving data in process 600. If a threat is detected, the threat is responded to in step 800. The respond-to-threat process 800 is shown in more detail in FIG. 10.

The process followed in responding to the detected threat may be a process provided by the customer. For example, a business may have a security process and existing security devices. The existing security systems are interfaced with the MCU such that the existing security systems are under the control of the MCU. The MCU transmits the received security data from the existing security device to the GOMAC and controls the operation of the existing security system as directed by the GOMAC. The customer's existing security process may be installed at the GOMAC such that, when a security threat is detected for that customer, the GOMAC response follows the customer's threat process. According to the flow diagram of FIG. 10, the threat process is followed in process 810. In process 820, the type of security threat detected is determined according to the threat process. Following the threat process for the type of security threat detected, an output is generated in process 830.

A non-response from the MCU or detection of an unauthorized deviation in the pre-approved route or schedule in process 820 may trigger an alert or alarm which is transmitted in process 860 to the appropriate person, officer, official, or agency. Likewise, if in process 730 the threat analysis detects that the asset has been tampered with or the integrity of the asset has been otherwise breached, the security threat is likewise transmitted in process 860 to an appropriate person, officer, official, or agency. When the asset is a mobile asset, the potential threat is transmitted from the GOMAC to the appropriate shipper officials or to government agencies or authorities based on the type of threat detected and the type of asset being monitored. The transmission may be an alert requiring follow-up or may be an alarm that cannot be ignored.

The output generated in process 830 may be a control data transmitted to the MCU 30 for controlling an operation of a system in process 850. For example, the detected threat may trigger more direct actions from the GOMAC such as bolting of certain doors in the building, controlling the operation of the ventilation system, lighting system or other system as required for the threat detected. Under predetermined circumstances, many actions may be automatically initiated simultaneously, eliminating the delays and errors that can occur when human intervention is a mitigating factor. The agent may monitor environmental conditions including the detection of a chemical, biological, or nuclear material within range of the particular agent. A video recording device is provided to monitor and record at least of an interior and an exterior of the asset. Real-time video monitoring can sense when an object is introduced into an area and has been left unattended. This may automatically trigger the tracking, from camera to camera, of any individual that was within the area during the time period in which the object was introduced. The output generated in process 830 may be to monitor the potential security threat in process 870. For example, a non-response from an agent when pinged may result in monitoring the threat via a nearby agent.

Figure 11:
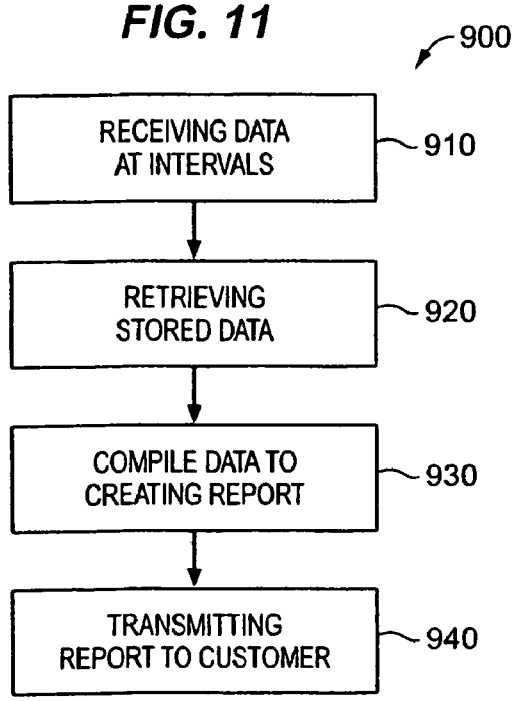
FIG. 11 is a flow diagram of a method of generating a report of the security status of an asset according to the present invention.

The generating a report process 900 is shown in more detail in FIG. 11. According to the flow diagram of FIG. 11, the security status and position data are received at intervals in step 910. The security status data and position data are stored at the server in process 650 and retrieved in process 920 for generating the report. In process 930, the retrieved security status data and position data are compiled to generate the report, and in process 940 the report is transmitted to the customer. At predetermined intervals, the customer is billed in process 1000 for the security monitoring service.

Figure 12:
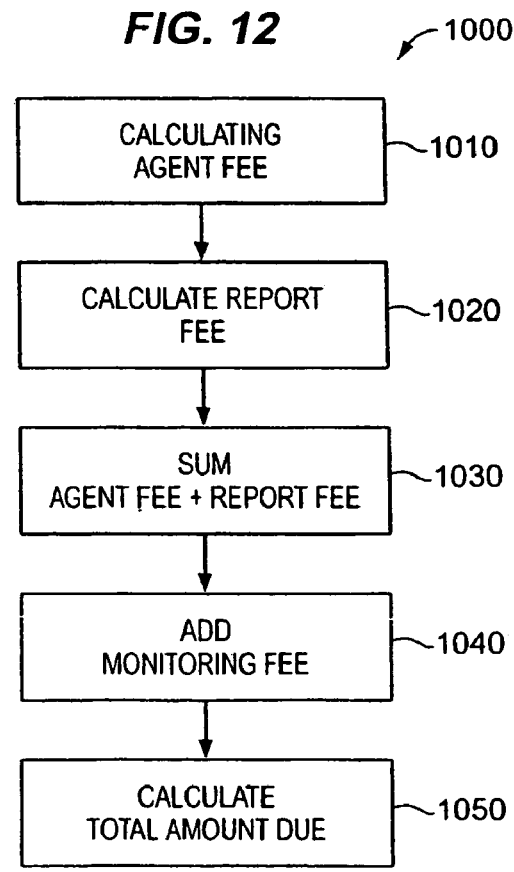
FIG. 12 is a flow diagram of a method of calculating a bill for security service according to the present invention.

The billing process 1000 is shown in more detail in FIG. 12. According to the flow diagram of FIG. 12, an agent fee and a report fee is calculated in processes 1010 and 1020, respectively, based on the number of agents monitored by the GOMAC and the number of reports generated for the customer during the interval. The agent fee and the report fee are summed in process 1030 and a monitoring fee for the interval is added to the sum in process 1040 to calculate a total amount due. In process 1050, an invoice 465 (FIG. 4) is generated, billing the customer for the total amount due.

Figure 13:
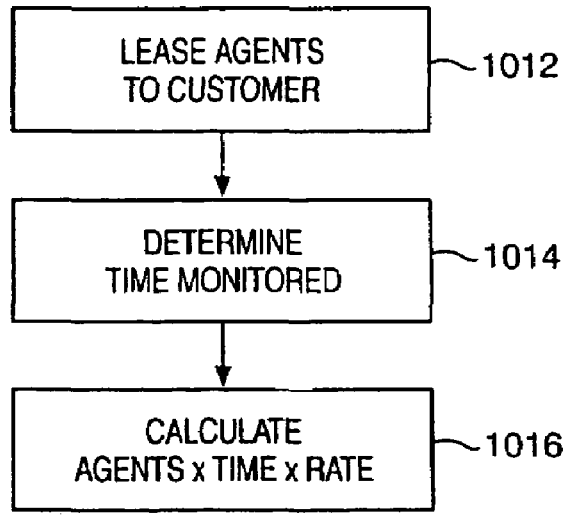
FIG. 13 is a flow diagram of another method of calculating a bill for security service according to the present invention.

The calculate agent fee process 1010 is shown in more detail in FIG. 13. According to the flow diagram of FIG. 13, the agents may be leased to the customer in process 1012. The lease fee is preferably calculated by determining the length of time the agents were monitored during the interval in process 1014 and multiplying the number of agents monitored during the interval times by the length of time they were monitored at a predetermined rate. For example, ten agents may be leased to a customer in process 1012 at a rate of $10/day. If the customer activated the agents on the fifteenth of a thirty-day month, the agent fee would be calculated as 10 agents for 15 days at a rate of $10/day for a total agent fee of $1500 for the one-month interval.

Figure 14:
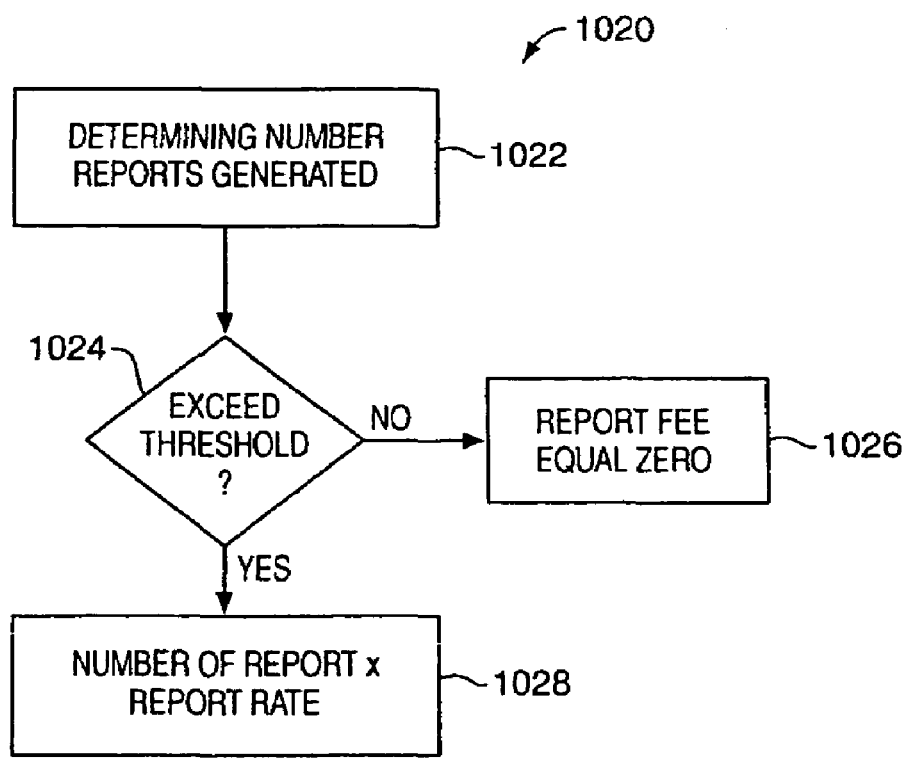
FIG. 14 is a flow diagram of another method of calculating a bill for security service according to the present invention.

In process 1020, a report fee is calculated. Preferably, the security monitoring service includes a predetermined number of reports per interval for the customer. Reports in excess are billed to the customer at a per report rate. According to the flow diagram of FIG. 14, to calculate the report fee the number of reports generated is determined in process 1022. The number of reports generated is compared with the predetermined number of reports allowed in process 1024. If the number of reports generated for the customer in process 900 does not exceed the predetermined number of reports in process 1024, the report fee is set equal to zero. If the number of reports generated in process 900 exceeds the predetermined number of reports in process 1024, the number of additional reports is multiplied by a report rate to calculate the report fee.

Following the value net integrator business model, the security service provider need not ship the containers or run a business to gather the security status data and position data; rather, the shipment of goods is out-sourced to a third party shipping company and the type of business operated by the customer is not a concern of the security service provider. By separating the physical goods and the fixed asset business from the security and position data, the security service provider adds value by using the security status data, position data, and security threat response better than a conventional physical shipping company or business can. Unfettered by the operation of the business being monitored or the physical goods being transported, and the need to deliver the goods in the physical world, the security service provider is able to concentrate on gathering, analyzing, and distributing security status data and position data, and responding to detected security threats. The security service tracks fixed and mobile assets globally and in real-time, allowing the security service provider to correlate the security data received from various location globally to extract a pattern of activity. Following the net value integrator business model, the security service provider owns the information that gives the physical world its operating data. In return for monitoring the security status of the fixed and mobile assets, the customer receives an invoice for the security service, which includes a monitoring fee and may include an agent lease fee and a report fee.

There has been described a novel business method for providing centralized security analysis and monitoring services for fixed and mobile assets. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described without departing from the inventive concepts. It is also evident that the methods recited may, in many instances, be performed in a different order; or equivalent structures and processes may be substituted for the various structures and processes described. Consequently, the invention is to be construed as embracing each and every novel feature and novel combination of features present in and/or possessed by the invention herein described.

What is claimed is:

1. A security system for providing a security service for monitoring a security status of at least one of a mobile asset and a fixed asset globally to detect and respond to a security threat, comprising:
    an agent connected with a corresponding one of the at least one of the mobile asset and the fixed asset, said agent comprising:
    a sensing device for monitoring at least one of a physical security and an environmental security of the at least one of the mobile asset and the fixed asset;
    a processor for compiling said at least one of said physical security and the environmental security to generate said security status; and
    a transceiver for transmitting a data from and receiving data to the agent;
    a computer system in communication with said agent for receiving said security status of said at least one of the mobile asset and the fixed asset;
    a database for storing the received security status;
    a threat detection analysis software for analyzing the security status to detect the security threat;
    a process for determining a response to the detected security threat based on a type of security threat detected;
    an output for performing the response in accordance with the process; and
    a method for billing the customer for the security service.

2. The security system of claim 1 further comprising a master control unit in communication with the agent for collecting the security status and retransmitting the security status to the computer system.

3. The security system of claim 1 wherein said agent includes at least one of a position guidance system and a receiver for receiving a position data, wherein the security status includes the position data.

4. The security system of claim 1 wherein the computer system comprises:
    a master control unit in communication with the agent; and
    a server located at a global operations center in communication with the master control unit for sending and receiving data to and from the master control unit.

5. A security system as in claim 1 wherein said sensing device comprises an environmental sensor for monitoring an ambient air within the at least one of the mobile asset and the fixed asset to detect the security threat.

6. A security system as in claim 1 wherein said sensing device comprises a chemical detector for detecting a chemical matter.

7. A security system as in claim 1 wherein said sensing device comprises a biological detector for detecting a biological matter.

8. A security system as in claim 1 wherein said sensing device comprises a radiation detector for detecting a radioactive material.

9. A security system as in claim 1 wherein said sensing device comprises a door position-sensing device for sensing an opening of at least one of a mobile asset door and a fixed asset door.

10. A security system as in claim 1 wherein said sensing device comprises a light-sensing device within at least one of the mobile asset and the fixed asset for sensing a luminescence level therein.

11. A security system as in claim 1 wherein said agent further comprises a video recording device for recording at least one of an interior of the at least one of the mobile asset and the fixed asset or an exterior area surrounding the at least one of the mobile asset and the fixed asset.

12. A method for providing a security service for monitoring a security status of an asset, the method comprising:
    providing a computer system in wireless communication with an agent having a sensor for sensing at least one of a physical security and an environmental security of the asset, the agent connected with the asset;
    said agent, processing a security data from said sensor to generate the security status;
    said agent, wirelessly transmitting the security status;
    said computer system:
    wirelessly receiving said security status from said agent;
    analyzing said received security status to detect a security threat;
    following a security process to respond to said detected security threat;
    generating a report from said received security status; and
    billing a customer for said security service.

13. The method of claim 12 wherein receiving a security status comprises:
    receiving a notification from said agent connected with said asset when said agent is initialized; and
    said agent transmitting said security status to said computer system.

14. The method of claim 12 wherein receiving said security status comprises receiving the security status at intervals.

15. The method of claim 12 wherein receiving the security status comprises receiving a digital image corresponding to at least one of an area surrounding the asset and an interior of the asset.

16. The method of claim 12 wherein receiving the security status comprises:
    receiving environmental data indicative of an environment within the asset to detect an environmental threat therein; and
    receiving physical condition data indicative of a physical condition of the asset to detect a tampering therewith.

17. The method of claim 16 wherein receiving environmental data comprises receiving chemical data indicative of a chemical matter within the asset for detecting a chemical threat therein.

18. The method of claim 16 wherein receiving environmental data comprises receiving biological matter data indicative of a biological matter within the asset to detect a biological threat therein.

19. The method of claim 16 wherein receiving environmental data comprises receiving explosive material data indicative of explosive material within the asset when an explosive material is detected.

20. The method of claim 16 wherein monitoring an environment comprises receiving nuclear radiation data indicative of a radiation within the asset for detecting a radiation threat therein.

21. The method of claim 20 further comprising analyzing the nuclear radiation data to confirm the radiation threat.

22. The method of claim 16 wherein receiving physical condition data comprises receiving door position data indicative of an opening of a door connected with the asset to detect a tampering therewith.

23. The method of claim 12 wherein following a security process comprises:
receiving the security process from a customer;
determining a type of threat detected; and
generating an output corresponding to said customer security process for the type of threat detected.

24. The method of claim 23 wherein generating an output comprises controlling an operation of a door connected with the asset in accordance with the security process.

25. The method of claim 23 wherein generating an output comprises controlling an operation of a ventilation system in accordance with the security process.

26. The method of claim 23 wherein generating an output comprises controlling an operation of a lighting system in accordance with the security process.

27. The method of claim 23 wherein generating an output comprises initiating a counter measure in accordance with the security process.

28. The method of claim 23 wherein generating an output comprises notifying at least one of an appropriate official and an appropriate agency in accordance with the security process.

29. The method of claim 12 wherein generating a report comprises:
receiving the security status at intervals;
storing the received security status; and
generating a report from the stored security status.

30. The method of claim 12 further comprising:
sending a request for an updated security status to the agent; and
in response to sending the request for the updated security status, receiving the updated security status from the agent.

31. The method of claim 12 wherein said asset is a fixed asset, the method further comprising:
providing a communication between an existing security device connected with said fixed asset and said computer system; and
said computer system, receiving a signal when said existing security device detects a threat.

32. The method of claim 31 further comprising:
receiving a security status from a plurality of the agents; and
each one of the plurality of agents, monitoring a security status of an area within the fixed asset.

33. The method of claim 12 further comprising staffing the global operations center with at least one subject matter expert to confirm the detected security threat.

34. The method of claim 12 further comprising interrogating the agent to determine a security status of the asset.

35. The method of claim 12 further comprising:
receiving a security process from a client;
storing the security process at the at least one server; and
following the stored security process in response to the detected security threat.

36. The method of claim 12 further comprising providing an access to the security status to a third party for use in generating reports.

37. The method of claim 12 further comprising providing an Internet access for the customer to access the security status corresponding to the asset monitored for the customer.

38. An automated method for monitoring a security status of a plurality of assets, the method comprising:
providing a plurality of agents to a customer, each one of the plurality of agents connected with an asset for monitoring a security of the asset to generate a security status;
providing a server in communication with the plurality of agents;
the server receiving a security status from the plurality of agents;
analyzing the received security status to detect a security threat to the asset with which a corresponding one of the plurality of agents is connected;
generating an output in response to the detected security threat in accordance with a process;
compiling the received security status at the server;
generating a report from the compiled security; and
transmitting the report to the customer.

39. The method of claim 38 wherein providing a plurality of agents to a customer comprises leasing the plurality of agents to the customer.

40. The method of claim 39 wherein the asset is a fixed asset including an existing security device connected with the asset and in communication with the server, the method further comprising:
receiving a threat detection signal from the existing security system; and
responding to the detected threat in accordance with the process.

* * * * *